US012094437B2

(12) United States Patent
Chen

(10) Patent No.: US 12,094,437 B2
(45) Date of Patent: Sep. 17, 2024

(54) COLOR ALIGNING METHOD OF DISPLAY AND RELATED COMPUTER SYSTEM

(71) Applicant: Wistron Corporation, New Taipei (TW)

(72) Inventor: Feng-Yuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/846,046

(22) Filed: Jun. 22, 2022

(65) Prior Publication Data

US 2023/0282180 A1 Sep. 7, 2023

(30) Foreign Application Priority Data

Mar. 3, 2022 (TW) .................................. 111107791

(51) Int. Cl.
*G09G 5/04* (2006.01)

(52) U.S. Cl.
CPC ....... *G09G 5/04* (2013.01); *G09G 2320/0242* (2013.01)

(58) Field of Classification Search
CPC .. G09G 5/02; G09G 5/04; G09G 5/06; H04N 1/60; H04N 2201/3256
See application file for complete search history.

(56) References Cited

U.S. PATENT DOCUMENTS

| | | | | |
|---|---|---|---|---|
| 2011/0115809 | A1 * | 5/2011 | Hilliard | H04N 1/00209 345/589 |
| 2014/0071149 | A1 * | 3/2014 | Chu | G06F 3/14 345/589 |
| 2020/0098333 | A1 * | 3/2020 | Marcu | G06T 7/90 |

FOREIGN PATENT DOCUMENTS

| | | | |
|---|---|---|---|
| CN | 102072772 | B | 12/2012 |
| CN | 111341264 | A | 6/2020 |

* cited by examiner

*Primary Examiner* — Antonio A Caschera
(74) *Attorney, Agent, or Firm* — Winston Hsu

(57) ABSTRACT

A color aligning method of display for a computer system having a processing unit, a display and a server includes determining, by the server, a color information file of the display according to a related information of the display; downloading, by the processing unit, the color information file of the display from the server; and enabling, by the processing unit, the color information file according to a preset mode of the display.

14 Claims, 5 Drawing Sheets

COLOR ALIGNING METHOD OF DISPLAY AND RELATED COMPUTER SYSTEM

BACKGROUND OF THE INVENTION

1. Field of the Invention

The present invention relates to a color aligning method of display and related computer system, and more particularly, to a color aligning method of display and related computer system capable of aligning color settings between the display and the computer system.

2. Description of the Prior Art

Conventional display includes a preset mode of color settings, e.g. sRGB color space or DCI-P3. When the conventional display connects a computer system, the displayed color is not accurate on the display when a color setting of the computer system is different to that of the preset mode of the display. In addition, since a color space of a driver of different displays are different, and parameters for color tuning of display panels of the identical manufacturer are universal, i.e. the color tuning is performed with identical parameters for all display panels. However, the universal parameters for the color tuning cannot calibrate differences generated during the manufacturing process, which affects the displayed color on the display.

Therefore, improvements are necessary to the prior art.

SUMMARY OF THE INVENTION

In light of this, the present invention provides a color aligning method of display and related computer system to tune color settings between the display and the computer system to improve the displayed color on the display.

An embodiment of the present invention discloses an color aligning method of display for a computer system having a processing unit, a display and a server, wherein the color aligning method comprises determining, by the server, a color information file of the display according to a related information of the display; downloading, by the processing unit, the color information file of the display from the server; and enabling, by the processing unit, the color information file according to a preset mode of the display.

Another embodiment of the present invention discloses a computer system, comprises a display; a server, configured to determine a color information file of the display according to a related information of the display; and a processing unit, coupled to the display and the server, configured to download the color information file of the display from the server and enable the color information file according to a preset mode of the display.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
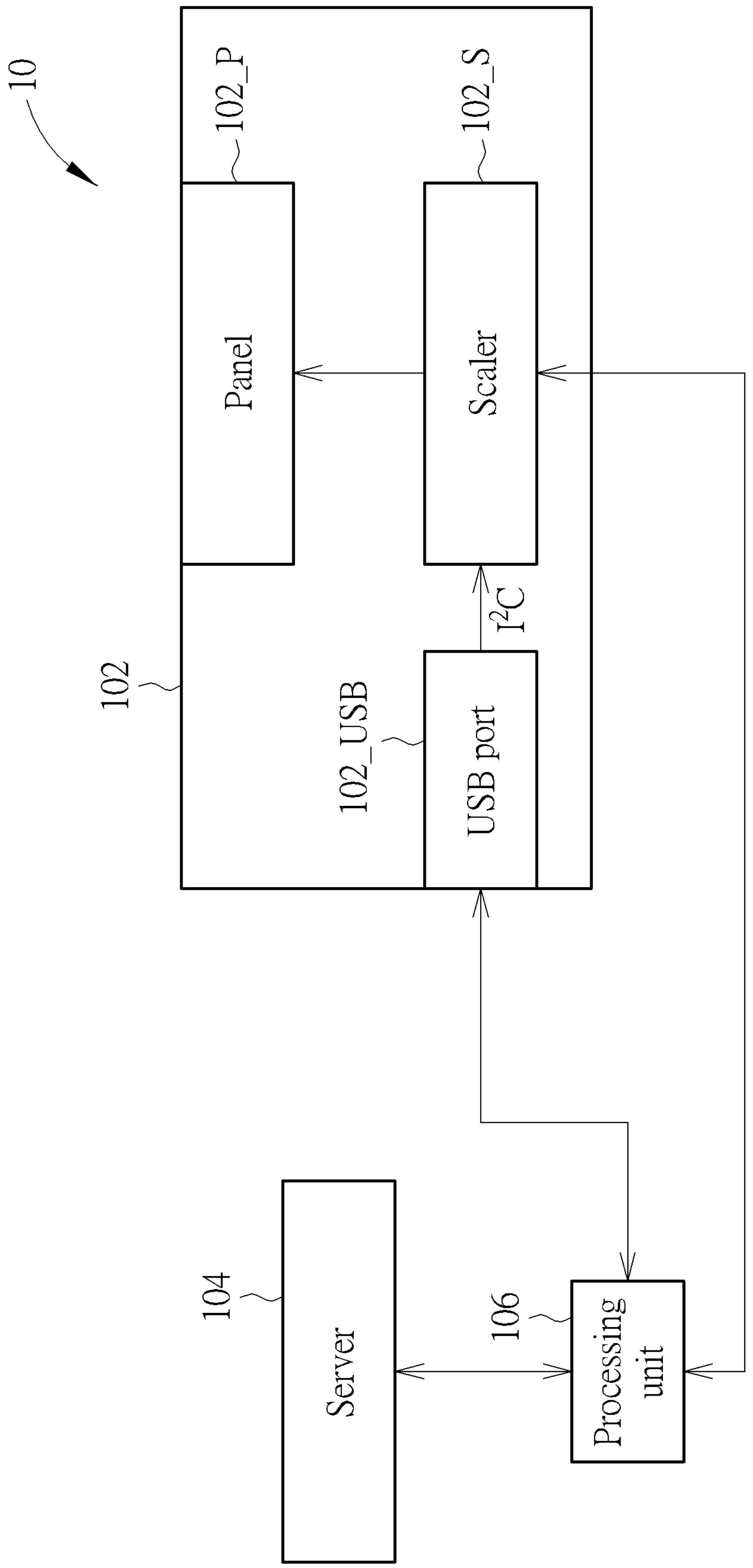
FIG. 1 and FIG. 2 are schematic diagrams of a computer system according to an embodiment of the present invention.
Figure 2:
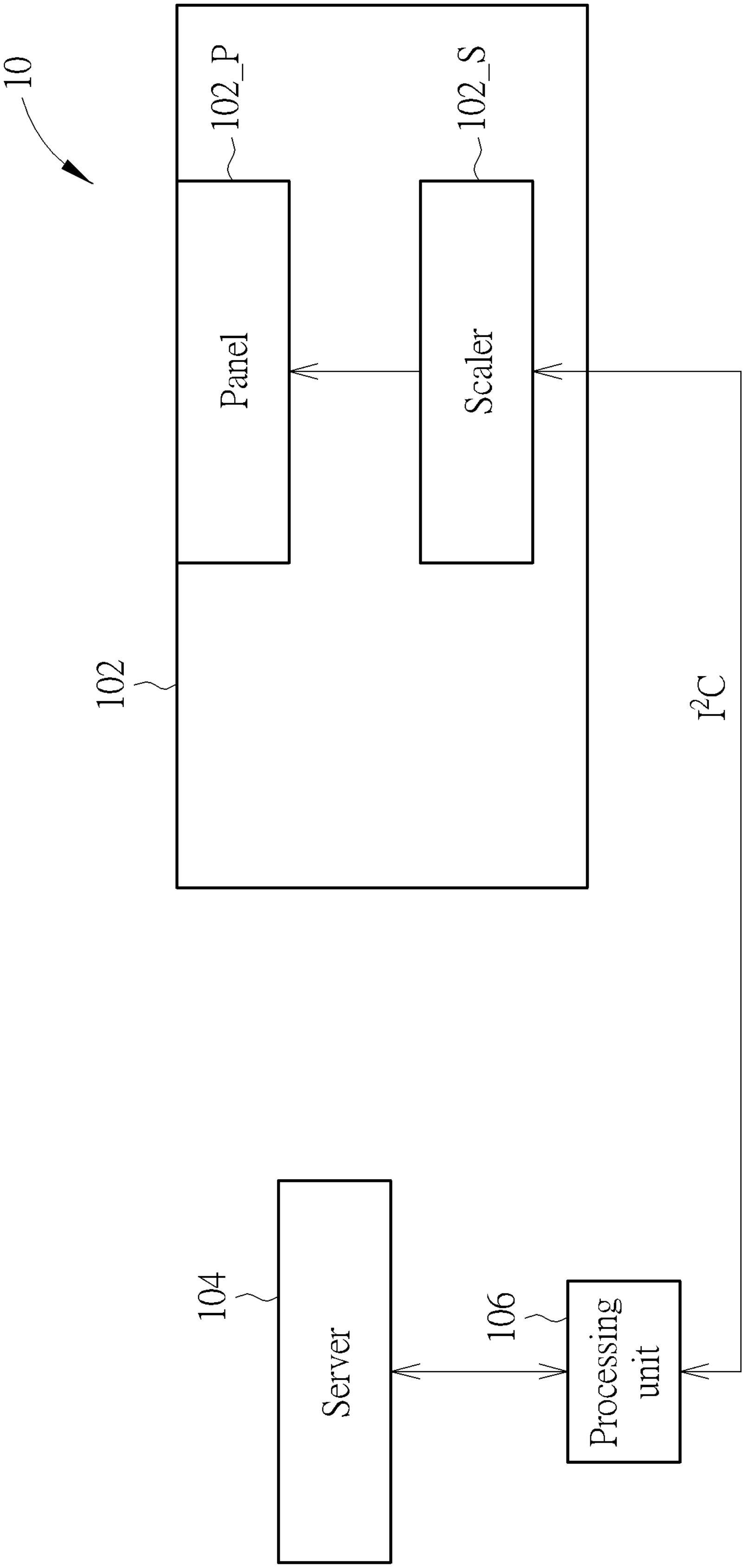

Please refer to FIGS. 1 and 2, which are schematic diagrams of a computer system 10 according to an embodiment of the present invention. The computer system 10 includes a display 102, a server 104 and a processing unit 106. The display 102 may include a panel 102_P, a scaler 102_S and a universal serial bus (USB) 102_USB. The server 104 may be an internet host, a web server or a cloud server to connect the processing unit 106 via a wired internet or a wireless internet. In an embodiment, the server 104 according to an embodiment of the present invention may determine a color information file corresponding to the display 102 according to related information of the display 102, e.g. an image color matching (ICM) file or an international color consortium (ICC) color characteristic file, the related information of the display 102 may be at least one of a product ID (PID), a vendor ID (VID) or a serial number of the display 102. The processing unit 106 is coupled to the display 102 and is configured to download the color information file related to the display 102 and enable the color information file according to a preset mode of the display 102, wherein the processing unit 106 may be a personal computer or a device with a processor, and the preset mode includes color space information of the display 102, e.g. standard Red Green Blue (sRGB) color space and DCI-P3. Therefore, the computer system 10 according to an embodiment of the present invention may perform alignment according to the preset mode of the display 102 and the color information file corresponding to the display 102 determined by the server 104, such that the color settings of the display and the computer system 10 may be aligned and a display effect of the display 102 is more accurate.

As shown in FIG. 1, the USB 102_USB of the display 102 may connect the processing unit 106 via an USB communication interface, and then the USB 102_USB may transmit the information to the scaler 102_S via an inter-integrated circuit ($I^2C$) interface. Alternatively, as shown in FIG. 2, the scaler 102_S of the display 102 may connect the processing unit 106 via an $I^2C$ interface for data transmission without the USB 102_USB.

When the display 102 is connected to the processing unit 106, the processing unit 106 may determine whether it is the first time to connect to the display 102 and then determine whether the processing unit 106 has a first software and/or a second software or not. When the processing unit 106 has no first software or second software, the processing unit 106 installs the first software and/or the second software. In an embodiment, the first software may be a communication interface between the processing unit 106 and the server 104, and the second software may be a communication interface between the processing unit 106 and the display 102 for obtaining the preset mode of the display 102. In another embodiment, the first software may independently be the communication interface between the server 104 and the display 102, i.e. the second software is not required to be the communication interface for the display 102, to obtain corresponding information.

After determining that the first software and the second software are installed on the processing unit 106, the processing unit 106 transmits a command of requesting the related information of the display 102, i.e. VID, PID and serial number, to the display 102. And the received related information of the display 102 is transmitted to the server 104. After the server 104 receives the related information of the display 102, a manufacturer of the display 102 may be determined according to the related information, e.g. the serial number, the server 104 determines the color information file of the display 102 according to a database of the manufacturer of the display 102, asks the processing unit 106 to download the color information file and to install the color information file on an operating system of the processing unit 106. In an embodiment, the server 104 may determine a current color information file of the display 102 by comparing the current color information file to the database provided by the manufacturer.

Then the processing unit 106 may further transmit a command of requesting the preset mode of the display 102 to the display 102 to determine whether the color information file downloaded by the processing unit 106 corresponds to the preset mode related to the color information of the display 102 or not. When the color information file of the display 102 downloaded by the processing unit 106 may correspond to the preset mode related to the color information of the display 102, the processing unit 106 enables the color information file. Therefore, the processing unit 106 may align the color settings of the display 102 and the processing unit 106 by calibrating the color information of the display 102 to improve the display effect of the display 102.

In an embodiment, when the processing unit 106 is connected to the display 102, i.e. the first software and/or the second software are/is detected in the processing unit 106, the processing unit 106 may directly transmit the command of requesting the preset mode of the display 102 to the display 102 to determine whether the color information file downloaded by the processing unit 106 corresponds to the preset mode related to the color information of the display 102 or not without downloading the first software and the second software.

Figure 3:
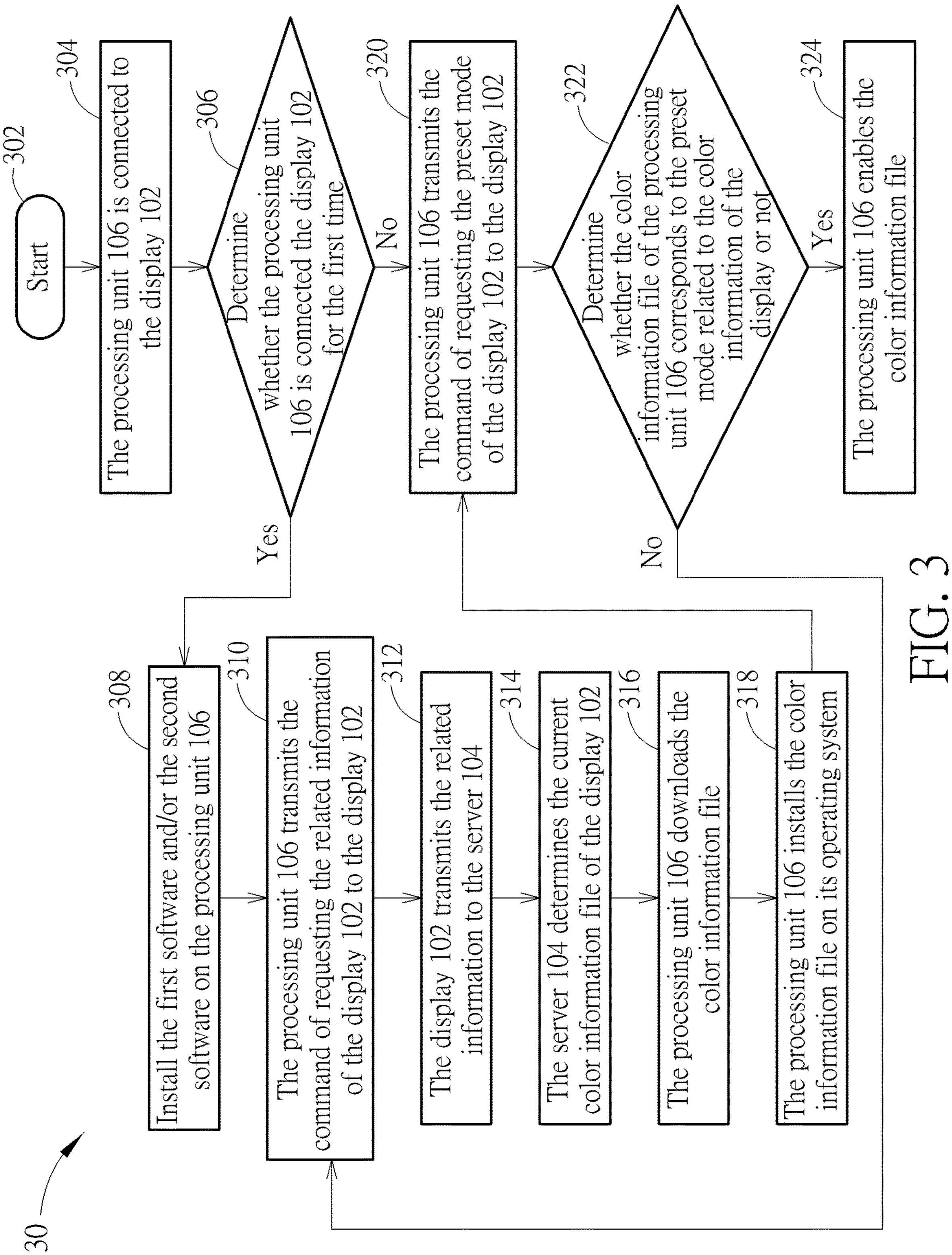
FIG. 3 is a schematic diagram of a color aligning method according to an embodiment of the present invention.

An operation of calibrating color of the display 102 may be summarized as a color aligning method 30, as shown in FIG. 3. The color aligning method 30 includes the following steps:

Step 302: Start;

Step 304: The processing unit 106 is connected to the display 102;

Step 306: Determine whether the processing unit 106 is connected the display 102 for the first time, if yes, goes to step 308; if no, goes to step 320;

Step 308: Install the first software and/or the second software on the processing unit 106;

Step 310: The processing unit 106 transmits the command of requesting the related information of the display 102 to the display 102;

Step 312: The display 102 transmits the related information to the server 104;

Step 314: The server 104 determines the current color information file of the display 102;

Step 316: The processing unit 106 downloads the color information file;

Step 318: The processing unit 106 installs the color information file on its operating system;

Step 320: The processing unit 106 transmits the command of requesting the preset mode of the display 102 to the display 102;

Step 322: Determine whether the color information file of the processing unit 106 corresponds to the preset mode related to the color information of the display or not, if yes, goes to step 324; if not, goes to step 310;

Step 324: The processing unit 106 enables the color information file.

The operation of the color aligning method 30 may be referred to the embodiment of the computer system 10 and not be narrated herein for brevity.

In another embodiment, after the processing unit 106 is connected to the display 102 for a period of time, a pixel shift of the panel 102_P of the display 102 may happen after use. In such condition, the current color information file cannot accurately correspond to the preset mode of the display 102, thus, the color information of the processing unit 106 is different to the color information of the display 102, and the display 102 cannot display the accurate color. The processing unit 106 of the computer system 10 according to an embodiment of the present invention may calibrate the current color information file.

In detail, the processing unit 106 may perform a color calibration process by a color calibration sensor of the display 102 to generate a color tuning parameter related to the display 102, such that the display 102 may perform a color verification process according to the color tuning parameter to generate an updated color information file. Then, the processing unit 106 may update the color information file to the server 104.

In an embodiment, if the scaler 102_S of the display 102 may perform the color calibration process, the display 102 may directly update the color tuning parameter and perform the color verification process, such that the processing unit 106 may generate an updated color information file according to the color verification process of the display 102.

In another embodiment, if the scaler 102_S of the display 102 cannot perform the color calibration process, the processing unit 106 may perform the color calibration process for the display 102 to generate the updated color information file. Then, the processing unit 106 may transmit the updated color information file to the server 104.

Figure 4:
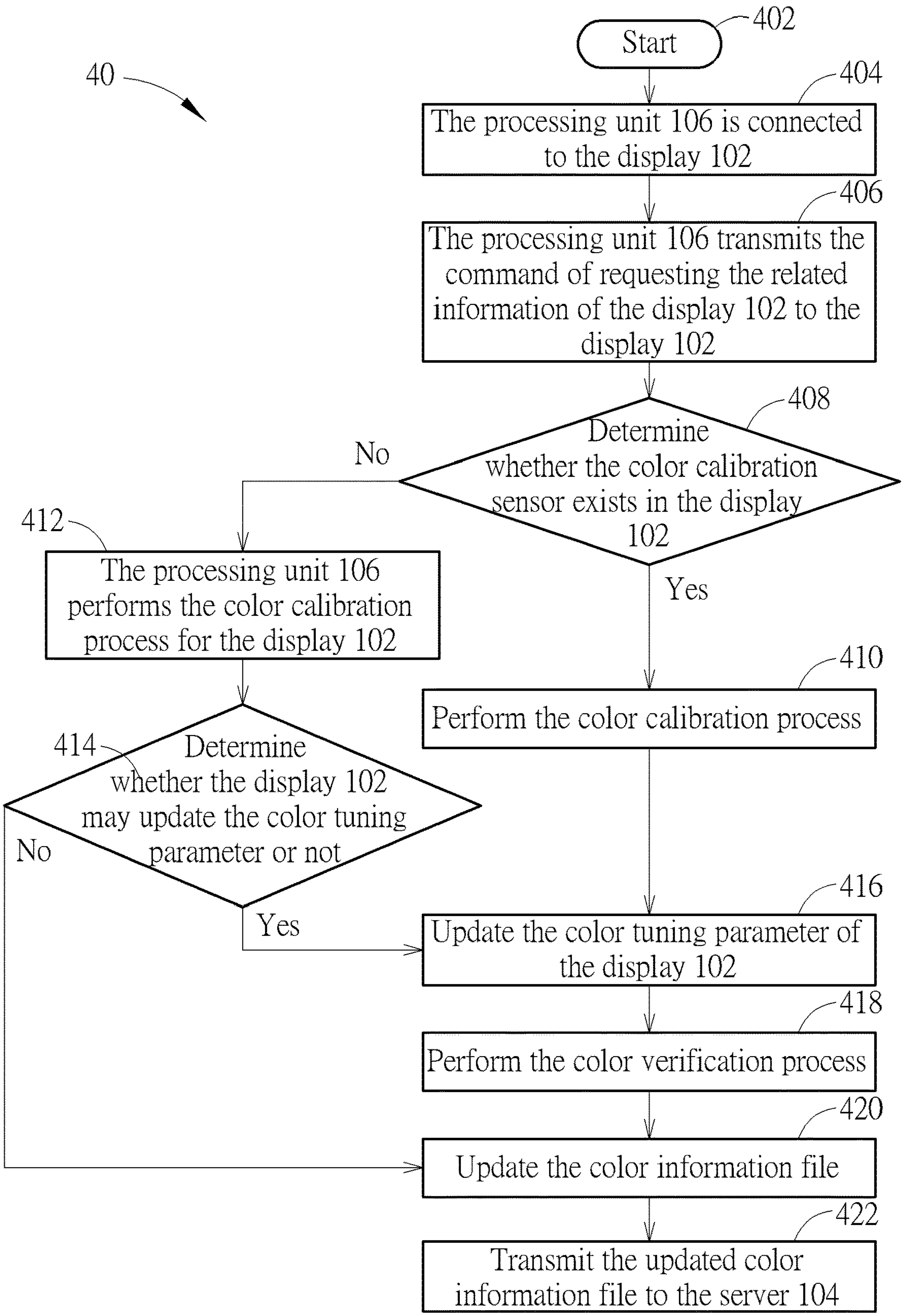
FIG. 4 is a schematic diagram of a color information file updating method according to an embodiment of the present invention.

An operation of updating the color information file of the display 102 may be summarized as a color information file updating method 40, as shown in FIG. 4, the color information file updating method 40 includes the following steps:

Step 402: Start;

Step 404: The processing unit 106 is connected to the display 102;

Step 406: The processing unit 106 transmits the command of requesting the related information of the display 102 to the display 102;

Step 408: Determine whether the color calibration sensor exists in the display 102, if yes, goes to step 410; if not, goes to step 412;

Step 410: Perform the color calibration process;

Step 412: The processing unit 106 performs the color calibration process for the display 102;

Step 414: Determine whether the display 102 may update the color tuning parameter or not, if yes, goes to step 416; if no, goes to step 420;

Step 416: Update the color tuning parameter of the display 102;

Step 418: Perform the color verification process;

Step 420: Update the color information file;

Step 422: Transmit the updated color information file to the server 104.

The operation of the color information file updating method 40 may be referred to the embodiment of the computer system 10 and not be narrated herein for brevity.

Notably, after the color information file of the display 102 of the computer system 10 is updated, the updated color information file is uploaded to the server 104. The server 104 may further transmit the color information file to other displays of identical brand or model in a multi-person meeting. As such, multiple displays connected to an identical server may simultaneously download the color information file to display the identical color effect on the display.

Figure 5:
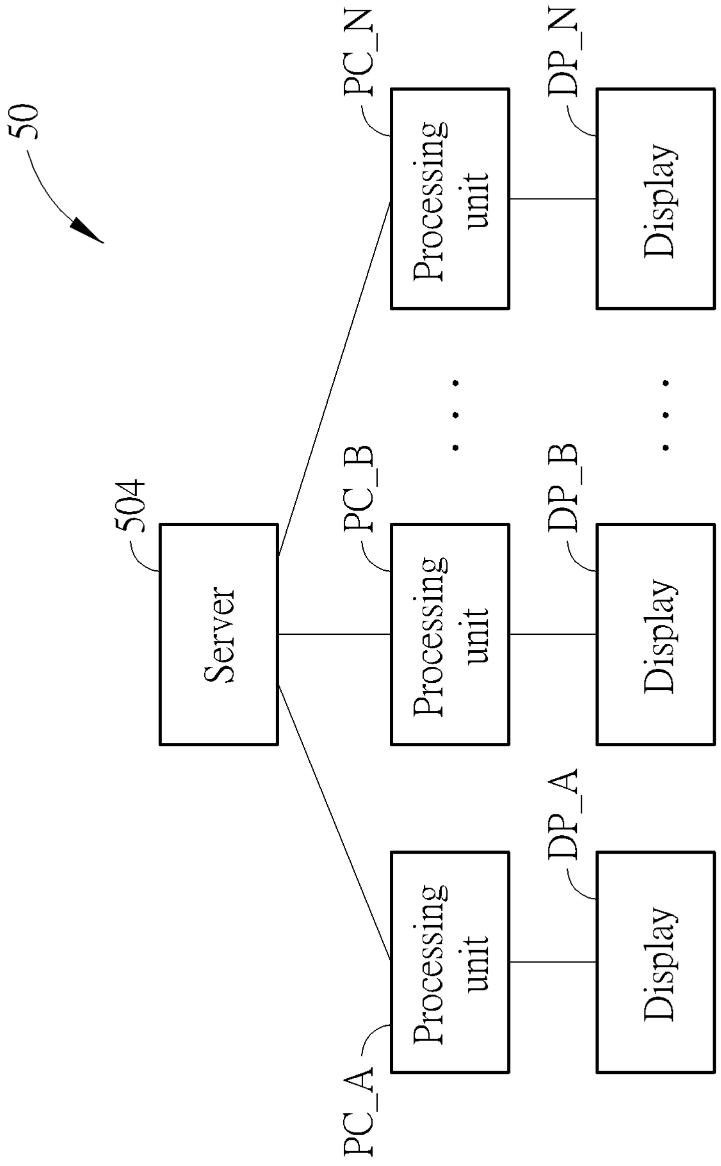
FIG. 5 is a schematic diagram of a system architecture according to an embodiment of the present invention.

The above embodiment may be a system architecture 50 illustrated in FIG. 5. The system architecture 50 includes a server 504, a plurality of displays DP_A-DP_N and a plurality of processing units PC_A-PC_N coupled to the displays DP_A-DP_N. Under the system architecture 50, after the display DP_A determines the color information file according to the color aligning method 30 and uploads the color information file to the server 104, other displays DP_B-DP_N may simultaneously download corresponding color information file, such that each of the displays DP_A-DP_N may display the color more accurate.

Similarly, after the display DP_A updates the color information file according to the color information file updating method 40 and uploads the updated color information file to the server 104, other displays DP_B-DP_N may simultaneously download the corresponding updated color information file, such that each of the displays DP_A-DP_N may display the color more accurate.

Notably, those skilled in the art may make modifications to the computer system 10 and the system architecture 50. For example, contents of the related information of the display or the color information may be modified according to system requirements, which are not limited thereto and all within the scope of the present invention.

In summary, the present invention provides a color aligning method of display and related computer system, which tunes color settings between the display and the computer system, such that the displayed color on the display is more accurate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A color aligning method of display for a computer system having a processing unit, a display and a server, wherein the color aligning method comprising:

determining, by the server, a color information file of the display according to a related information of the display;

downloading, by the processing unit, the color information file of the display from the server;

enabling, by the processing unit, the color information file by determining whether the color information file of the processing unit corresponds to a preset mode of the display; and transmitting, by the processing unit, the related information of the display from the display to the server wherein the step of the processing unit downloading the color information file of the display from the server includes:

installing the color information file on an operating system of the processing unit; and transmitting a command of requesting the preset mode of the display to the display;

wherein the processing unit further includes a software for acquiring the preset mode of the display, wherein the preset mode includes color space information of the display.

2. The color aligning method of claim 1, wherein the related information of the display is at least one of a product ID (PID), a vendor ID (VID) or a serial number.

3. The color aligning method of claim 1, further comprising:

transmitting, by the processing unit, a command of requesting the related information of the display to the display.

4. The color aligning method of claim 1, wherein the processing unit further includes a first software as a communication interface with the server.

5. The color aligning method of claim 1, further comprising:

performing, by a color calibration sensor of the display, a color calibration process to generate a color tuning parameter related to the display;

performing, by the display, a color verification process according to the color tuning parameter to generate an updated color information file; and transmitting the updated color information file to the server.

6. The color aligning method of claim 1, further comprising:

reading, by the processing unit, a color calibration sensor of the display to perform a color calibration process to generate an updated color information file; and transmitting the updated color information file to the server.

7. The color aligning method of claim 6, wherein the step of reading, by the processing unit, the color calibration sensor of the display to perform the color calibration process to generate the updated color information file includes:

performing, by the processing unit, a color verification process according to a color tuning parameter of the display; and generating, by the processing unit, the updated color information file according to the color verification process.

8. A computer system, comprising:

a display;

a server, configured to determine a color information file of the display according to a related information of the display; and a processing unit, coupled to the display and the server, configured to download the color information file of the display from the server and enable the color information file by determining whether the color information file of the processing unit corresponds to a preset mode of the display;

wherein the processing unit installs the color information file on an operating system of the processing unit, and transmits a command of requesting the preset mode of the display to the display;

wherein the processing unit further includes a software for acquiring information of the preset mode of the display, wherein the preset mode includes color space information of the display;

wherein the processing unit transmits the related information of the display from the display to the server.

9. The computer system of claim 8, wherein the related information of the display is at least one of a product ID (PID), a vendor ID (VID) or a serial number.

10. The computer system of claim 8, wherein the processing unit is configured to transmit a command of requesting the related information of the display to the display.

11. The computer system of claim 8, wherein the processing unit further includes a first software as a communication interface with the server.

12. The computer system of claim 8, wherein the display performs a color calibration process by a color calibration sensor to generate a color tuning parameter related to the display, performs a color verification process according to the color tuning parameter to generate an updated color information file and updates the color information file to the server.

13. The computer system of claim 8, wherein the processing unit reads a color calibration sensor of the display to perform a color calibration process to generate an updated color information file; and transmits the updated color information file to the server.

14. The computer system of claim 13, wherein the processing unit performs a color verification process according to a color tuning parameter of the display; and generates the updated color information file according to the color verification process.

* * * * *